(12) United States Patent
Neff

(10) Patent No.: US 11,117,658 B2
(45) Date of Patent: Sep. 14, 2021

(54) PROPULSION SYSTEM FOR AN AERIAL VEHICLE

(71) Applicant: William J. Neff, Sandy, UT (US)

(72) Inventor: William J. Neff, Sandy, UT (US)

(*) Notice: Subject to any disclaimer, the term of this patent is extended or adjusted under 35 U.S.C. 154(b) by 20 days.

(21) Appl. No.: 16/206,862

(22) Filed: Nov. 30, 2018

(65) Prior Publication Data
US 2020/0172234 A1 Jun. 4, 2020

(51) Int. Cl.
| | |
|---|---|
| *B64C 29/00* | (2006.01) |
| *B64C 37/00* | (2006.01) |
| *B64C 25/66* | (2006.01) |
| *B64C 27/08* | (2006.01) |
| *B64C 25/36* | (2006.01) |
| *B60F 5/02* | (2006.01) |

(52) U.S. Cl.
CPC ............ *B64C 29/0033* (2013.01); *B60F 5/02* (2013.01); *B64C 25/36* (2013.01); *B64C 25/66* (2013.01); *B64C 27/08* (2013.01); *B64C 37/00* (2013.01)

(58) Field of Classification Search
CPC .................................................. B64C 29/0033
See application file for complete search history.

(56) References Cited

U.S. PATENT DOCUMENTS

| | | | |
|---|---|---|---|
| 6,464,166 B1 | 10/2002 | Yoeli | |
| 8,794,566 B2* | 8/2014 | Hutson | F16M 13/02 244/17.23 |
| 9,364,766 B2* | 6/2016 | Mielniczek | A63H 27/12 |
| 9,796,482 B2* | 10/2017 | Apkarian | G03B 15/006 |
| 10,322,796 B2* | 6/2019 | Lee | B64C 39/024 |
| 2004/0104303 A1* | 6/2004 | Mao | B64C 37/00 244/12.5 |
| 2006/0016930 A1* | 1/2006 | Pak | B64D 35/04 244/12.4 |
| 2008/0048065 A1* | 2/2008 | Kuntz | B64C 39/024 244/17.23 |

(Continued)

OTHER PUBLICATIONS

Kang, English abstractor KR2018106253A (Year: 2018).*

(Continued)

*Primary Examiner* — Charlie Y Peng
(74) *Attorney, Agent, or Firm* — Workman Nydegger

(57) ABSTRACT

A propulsion system for an aerial vehicle or toy aerial vehicle is disclosed. The system comprises a ducted fan or shrouded propeller drive system for driving the vehicle along ground, the ducted fan or shrouded propeller drive system operating in a plane and having a peripheral ground-engagement part or hubless wheel. The system further comprises a ducted fan or shrouded propeller comprising one or more blades rotatable about a ducted fan or shrouded propeller axis for producing thrust, wherein the ducted fan or shrouded propeller is mounted as such that it may tilt or rotate so that during ground travel it may be in the same plane as the hubless wheel and during operation of the ducted fan or shrouded propeller for flight the blades pass through the plane and inside the hubless wheel. In this way, the ducted fan or shrouded propeller blades of the drive system are protected from blade strikes on obstacles and personnel operating around the ducted fan or shrouded propeller drive system are protected from harm from exposed rotors or blades with no duct or shroud surrounding them.

19 Claims, 6 Drawing Sheets

(56) References Cited

U.S. PATENT DOCUMENTS

| | | |
|---|---|---|
| 2016/0137304 A1 | 5/2016 | Phan et al. |
| 2016/0280386 A1 | 9/2016 | Mestler et al. |
| 2018/0065743 A1 | 3/2018 | Vondrell et al. |
| 2018/0201384 A1 | 7/2018 | Barth et al. |
| 2018/0354607 A1* | 12/2018 | Marot .................... F16M 11/18 |
| 2019/0256200 A1 | 8/2019 | Neff |
| 2020/0023701 A1* | 1/2020 | Salem ................... B64C 11/001 |

OTHER PUBLICATIONS

INRIX 2015 Traffic Scorecard Sets Benchmark for U.S. Cities as Federal Government Accelerates Smart City Spending, https://inrix.com/press-releases/scorecard-us/, Jan. 12, 2021.

Malloy Aeronautics, https://www.hover-bike.com/#lightbox[gallery_imge_1]/0, Jan. 12, 2021.

Non-Final Office Action received for U.S. Appl. No. 15/902,917, dated Feb. 4, 2021, 11 pages.

Final Office Action received for U.S. Appl. No. 15/902,917, dated Jul. 9, 2021, 12 pages.

* cited by examiner

PROPULSION SYSTEM FOR AN AERIAL VEHICLE

FIELD OF THE INVENTION

This disclosure relates to a propulsion system for an aerial vehicle, manned or unmanned, which have the capability of traveling on the ground or in the air.

BACKGROUND OF THE INVENTION

Currently, the principal approaches for practical vertical-takeoff-and-landing (VTOL) flight vehicles can be grouped into three broad categories: high-speed vehicles using jet thrust or variations of jet thrust and highly loaded lifting fans (e.g., the Harrier and the JSF/F-35B); medium-speed vehicles with rotors (e.g., helicopters and tilt-rotors); and low-speed lifting fan or ducted fan vehicles with more than one lifting fan (such as a flying platform like the Piasecki Flying Jeep). These approaches have good capabilities in the air, but are not suited for efficient movement on the ground, especially on rough terrain.

In many designs, the propulsion system is used to provide both vertical forces for hover and horizontal forces for forward flight. This can be done by tilting the VTOL propulsion device (e.g., a tilt-rotor) or by providing a separate propulsion device. Some implementations of VTOL aircraft such as consumer quadcopters or drones generate horizontal propulsion forces by tilting the entire vehicle. However, these vehicles generally do not perform well on the ground and in the air.

It is therefore desirable to have a vehicle with all-terrain capability on the ground as well as vertical take-off and landing and moving take-off and landing air capabilities. This present invention provides a propulsion system for a vehicle or toy vehicle comprising a ducted fan or shrouded propeller drive system for driving the vehicle along the ground, the ducted fan or shrouded propeller drive system operating in a section of a wheel or tire and having a peripheral ground-engagement part, the system further comprising a ducted fan or shrouded propeller comprising one or more fan or propeller blades rotatable about a hub or axis for producing thrust, wherein the ducted fan or shrouded propeller drive system and the tan or propeller blades are positioned relative to each other so that during rotation of the fan or propeller blades, the blades pass through the plane f the ducted fan or shrouded propeller system, inside the peripheral ground-engagement part, illustrated herein as a hubless wheel.

SUMMARY

The following implementations and aspects thereof are described and illustrated in conjunction with systems, machines, and methods that are meant to be exemplary and illustrative, not necessarily limiting in scope. In various implementations one or more of the above-described problems have been addressed, while other implementations are directed to other improvements.

Beneficially, the propulsion system according to the invention disclosed herein allows for travel on the ground by virtue of the peripheral ground-engagement part and drive mechanism and for travel in the air by virtue of the ducted fan or shrouded propeller drive system.

The invention advantageously provides a compact arrangement with the ducted fan or shrouded propeller drive system passing through the plane of the rotary peripheral ground-engagement part drive system. Further, because the fan or propeller blades are inside a duct or shroud and the peripheral ground-engagement part extends around the ducted fan or shrouded propeller drive system to some extent, it protects the fan or propeller blades from contacting external objects as well as reducing noise from the propulsion system.

The disclosed invention also provides a vehicle or a toy vehicle comprising a chassis and one or more propulsion systems as defined above connected to the chassis.

Firstly, in various embodiments, the invention is implemented as a four-wheeled vehicle (i.e., having four propulsion systems, which can drive as well as fly) and capable of vertical take-off and landing while stopped or while moving. Additionally, in various embodiments, ground travel can be achieved by engaging a rear wheel drive system, while the front wheels components remain in neutral or steer.

Additionally, in various embodiments, the power source for the ducted fan or shrouded propeller drive system and rotary peripheral ground-engagement part drive system may be mechanically powered (i.e., by a combustion engine causing a shaft to rotate, which in turn through a series of gears, a clutch, universal joints, or otherwise or electrically powered by either or both a battery or rechargeable battery or the drive system may be powered by both a hybrid mechanical and electrical source.

In various embodiments, the ducted fan or shrouded propeller drive system may rotate or pivot so it may be in the same plane as the tire or rotary peripheral ground-engagement part drive system and may pivot so it is crosswise or transverse the rotary peripheral ground-engagement part drive system.

In various embodiments, the tire or rotary peripheral ground-engagement part drive system is self-contained in the peripheral ring so as not to interfere with the rotation or pivoting ability of the ducted fan or shrouded propeller drive system.

These and other advantages will become apparent to those skilled in the relevant art upon a reading of the following descriptions and a study of the several examples of the drawings.

BRIEF DESCRIPTION OF THE DRAWINGS

The present invention can be put into practice in various ways, but embodiments will now be described by way of example only with reference to the accompanying drawings in which.

DETAILED DESCRIPTION

Figure 1:
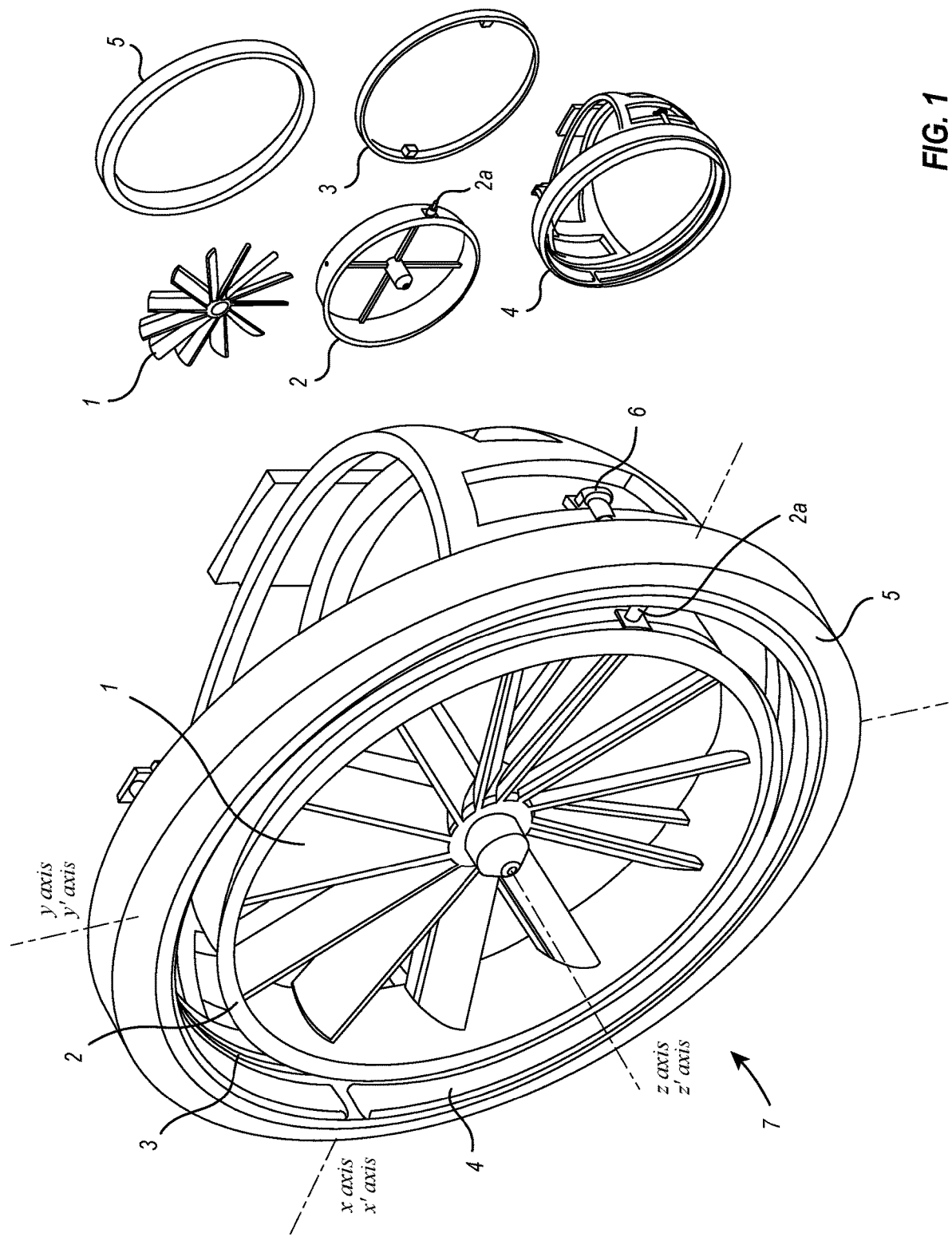
FIG. 1 Diagram depicting a possible configuration of an illustrative embodiment of a ducted fan or shrouded propeller drive system rotated or pivoted to be on the same plane as the rotary peripheral ground-engagement part drive system and in which the rotary peripheral ground-engagement part is powered by electric, motors attached to the rim.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, any claims herein are not to be limited to that embodiment. Moreover, any such claims are not to be read restrictively unless there is clear and convincing evidence manifesting a certain exclusion, restriction, or disclaimer.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art.

One or more embodiments of a ducted fan or shrouded propeller drive system and rotary peripheral ground-engagement part drive system can be used in aerial vehicles to overcome the weight of the vehicle and load necessary to provide lift and airborne maneuvering capabilities.

FIG. 1 is a diagram depicting separate components and a possible configuration of the components in an illustrative embodiment of a ducted fan or shrouded propeller drive system rotated or pivoted to be on the same plane as the rotary peripheral ground-engagement part drive system. The propulsion system shown here comprises the 1. fan or propeller blades which affix to 2. a hub in the duct for the fan or shroud for the propeller, as it is generally called depending on the number of rotor blades involved, which is attached to gimbal or 2a. pivot points on 3. a ring that allows the 2. duct/shroud to rotate about a pivot axis (x') that is defined by the 2a. pivot points and fixed relative to the 3. ring. The 3. ring can also be caused by mechanical or electrical means such as a servo motor to tilt or rotate forward or backward about a hubless wheel axis (z) to alter the position of the pivot axis (x') relative to the hubless wheel. The 3. ring is contained inside the 4. peripheral ground-engagement part drive system (here simply expressed as a hubless rim or hubless wheel) which also attaches to the body of the vehicle and which contains a 5. rotatable tire which can rotate by 6. mechanical or electrical power around the hubless wheel axis (z). The entire drive system identified here as 7. The propulsion system also has a ducted fan or shrouded propeller rotatable around its hub's axis (z'). The ducted fan or shrouded propeller axis (z') lies in center of the hubless wheel axis (z) and can rotate to be in the same plane within the rim of the hubless wheel or crosswise or perpendicular to the hubless wheel axis (z). In this diagram it depicts the position the ducted fan will generally be in when the vehicle is on the ground or engaged in ground travel. Since the ducted fan or shrouded propeller drive and the hubless wheel may be running at the same time the ducted fan may rotate while the hubless wheel is being powered and moving along the ground. Therefore, the ducted fan can rotate on its axis (z') and start spinning, and the vehicle can go from ground travel to air travel seamlessly without having to bring the vehicle to a stop and then start the aerial capabilities of the vehicle.

Figure 2:
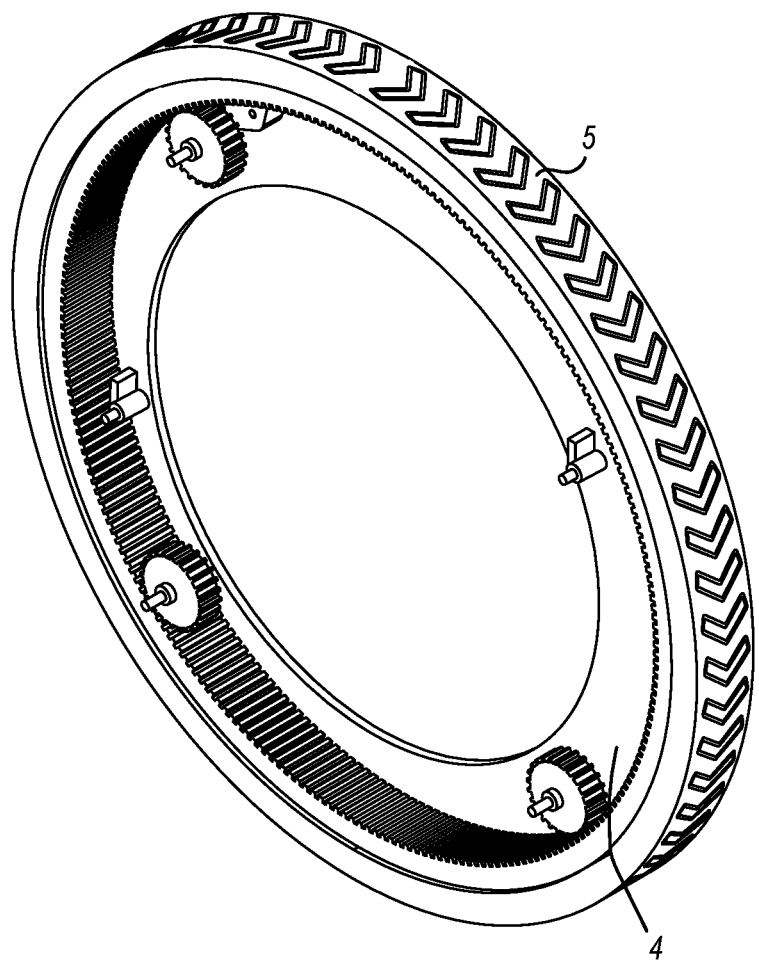
FIG. 2 Diagram depicting a possible configuration of an illustrative embodiment of the rotary peripheral ground-engagement part drive system using toothed gears or cogs and a cogged ring on the outer peripheral ground-engagement part to rotate the tire.

FIG. 2 is a diagram depicting a possible configuration of an illustrative embodiment of the rotary peripheral ground-engagement part drive system in which 4. the hubless wheel is using toothed gears or cogs and the 5. rotatable tire comprises a cogged ring on the inner part. This allows the 5. rotatable tire component of the peripheral ground-engagement part to turn while the inside is attached to the vehicle. It is understood the drive system may use outward facing cogged ring or wheels on tension or friction to contact and cause the 5. tire component of the outer peripheral ground-engagement part to rotate. In some embodiments (not shown), the illustrated hubless wheel design is adapted to create a ducted fan or shrouded propeller drive system comprising rim-driven or hubless ducted fans or rim-driven or hubless shrouded propellers inside the hubless wheel. It is understood that alternative known rim-driven or hubless designs of both wheels and ducted fan or shrouded propeller systems may be included in embodiments according to the present disclosure.

Figure 3:
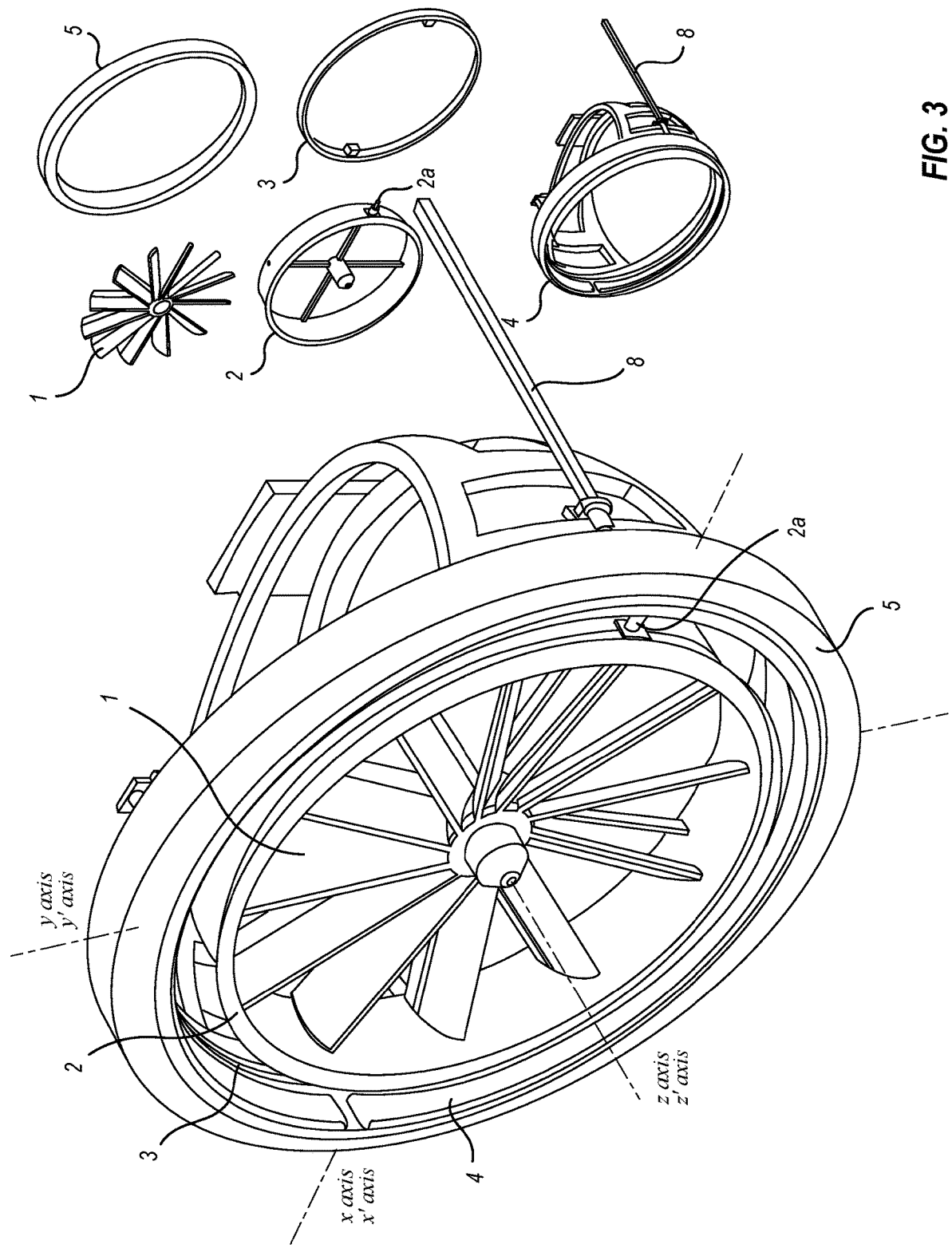
FIG. 3 Diagram depicting a possible configuration of an illustrative embodiment of a ducted fan or shrouded propeller drive system where the rotary peripheral ground-engagement part component is powered through mechanical means here a drive shaft mechanically powered by an engine and with one end having toothed gears or cogs and a cogged ring on the outer peripheral ground-engagement part to rotate the tire.

FIG. 3 is a diagram depicting separate components and a possible configuration of the components in an illustrative embodiment of a ducted fan or shrouded propeller drive system rotated or pivoted to be on the same plane as the rotary peripheral ground-engagement part drive system as described in FIG. 1. However, here it shows 8. a mechanically powered drive shaft that rotates the rotatable tire through mechanical means such as friction rollers or toothed gears.

Figure 4:
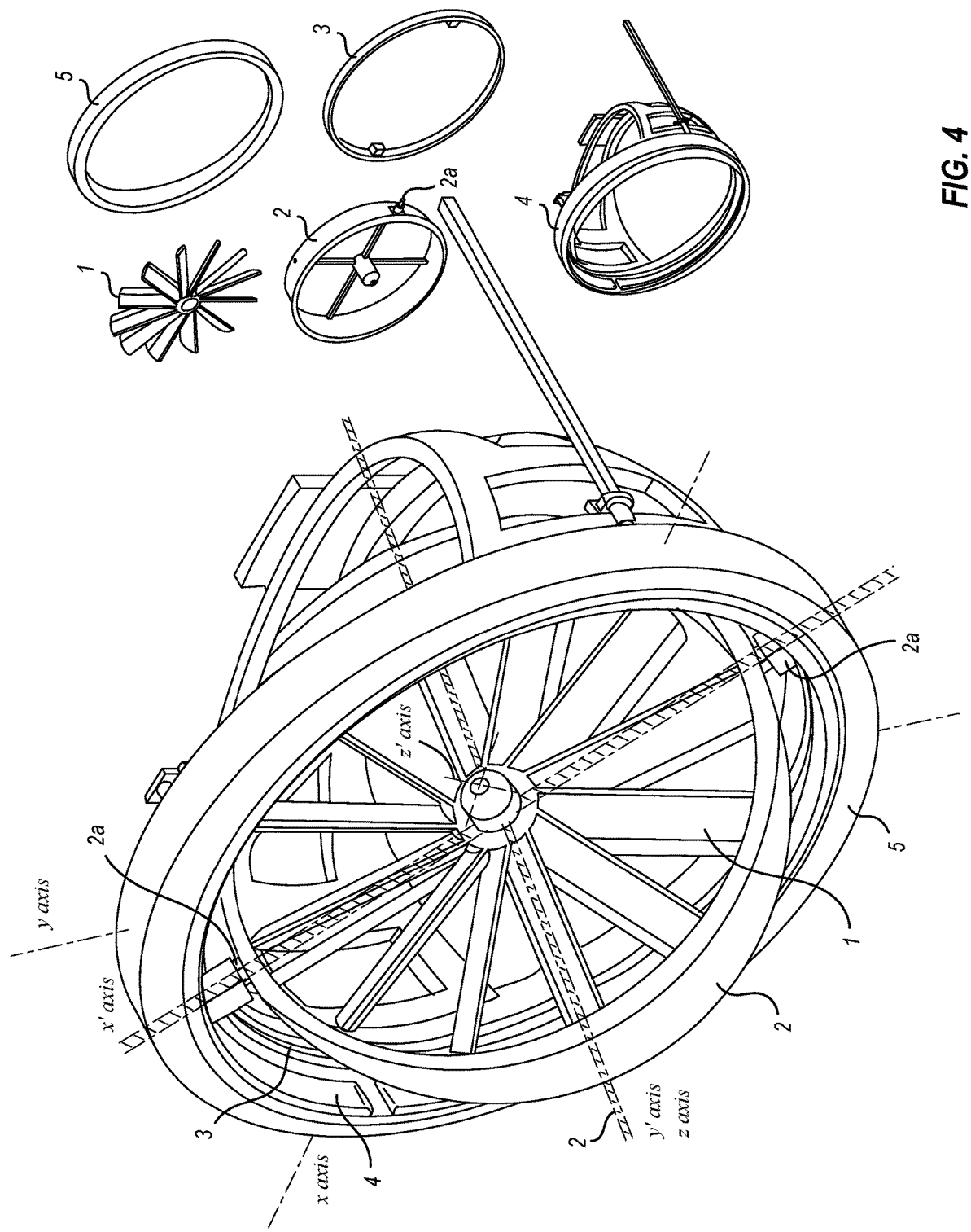
FIG. 4 Diagram depicting a possible configuration of an illustrative embodiment of a ducted fan or shrouded propeller drive system rotated or pivoted to be crosswise the plane of the rotary peripheral ground-engagement part drive system and tilted forward.

FIG. 4 is a diagram depicting a possible configuration of an illustrative embodiment as described in the preceding paragraph, but where the y'-axis of the 2. ducted fan or shrouded propeller component is rotated or pivoted about the x'-axis thereof to be crosswise the plane of the 4. peripheral ground-engagement part's x-axis and y-axis, such that the y'-axis of the ducted fan or shrouded propeller component coincides with the z-axis of the hubless wheel, and the z'-axis of the ducted fan or shrouded propeller component is orthogonal to the z-axis of the hubless wheel, which can be done by a servo motor or other device that governs the speed and degree of rotation about the 2a. pivot points. This will be the position the ducted fan is in when the aerial vehicle lifts off the ground and while it is airborne. As in a consumer quadcopter drone, most of the maneuvering or steering of the vehicle while in flight will be controlled through the power and speed of each ducted fan; however, tilting the x'-axis of the 2. ducted fan from its horizontal X-position via rotation of the 3. ring about the z-axis of the hubless wheel to reposition the z'-axis of the ducted fan or shrouded propeller component, as shown, will also add maneuverability features to the aerial vehicle.

Figure 5:
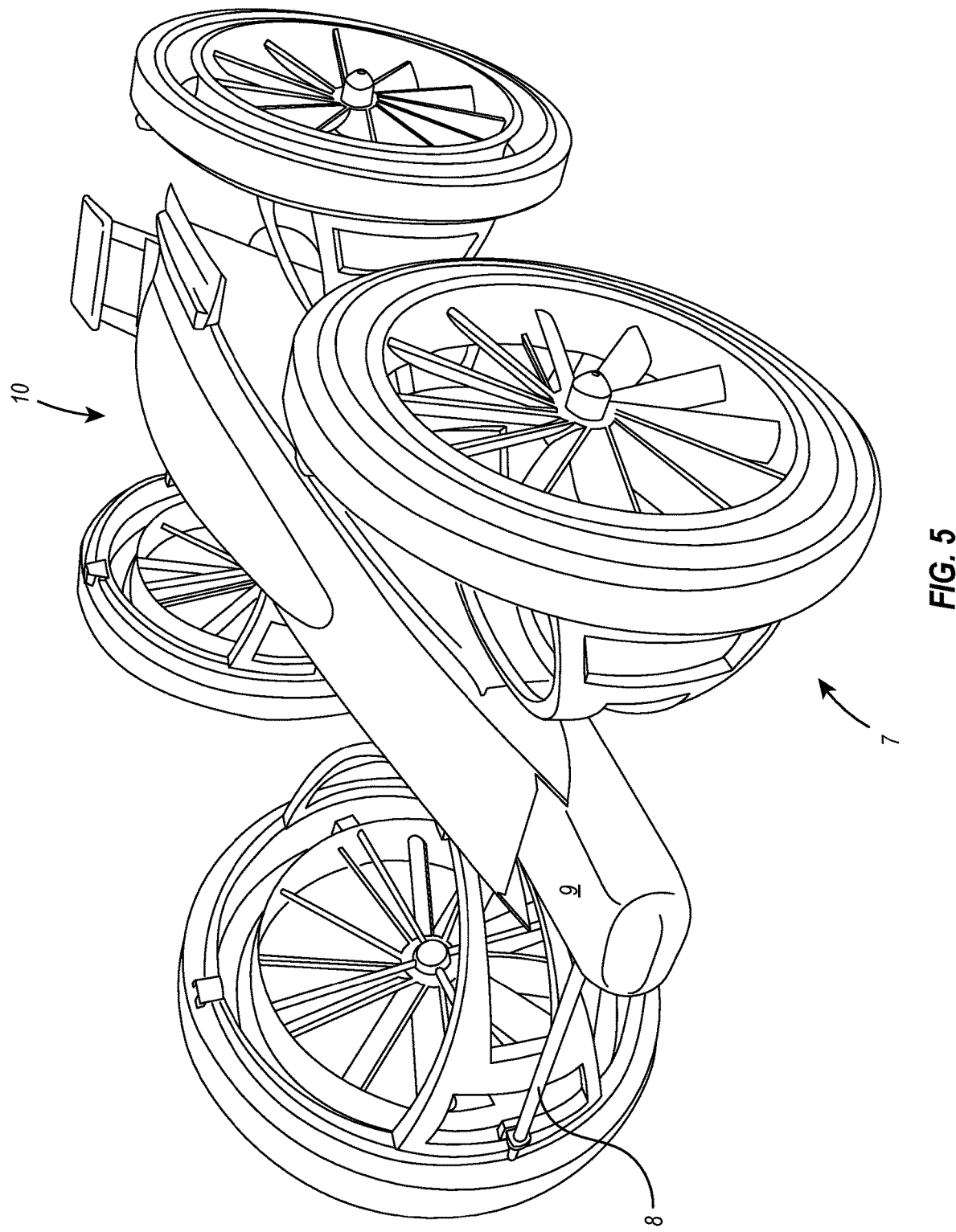
FIG. 5 shows an illustrative embodiment of an aerial vehicle with the ducted fan or shrouded propeller drive system in the same plane as the rotary peripheral ground-engagement part drive system and the rotary peripheral ground-engagement part drive system powered by mechanical means.

FIG. 5 is, a diagram depicting a possible embodiment of 10. an aerial vehicle comprising the ducted fan or shrouded propeller drive system and the rotary peripheral ground-engagement part drive system as, described in FIG. 1 as comprising 7, the entire drive system. Here, where the 5. outer tire component is rotated and powered by mechanical means. This necessitates a power source 9., e.g., an engine, and drive shaft 8. to power a contact device, e.g., toothed gears or friction contact wheels, to turn the 5. tire portion of the hubless wheel.

Figure 6:
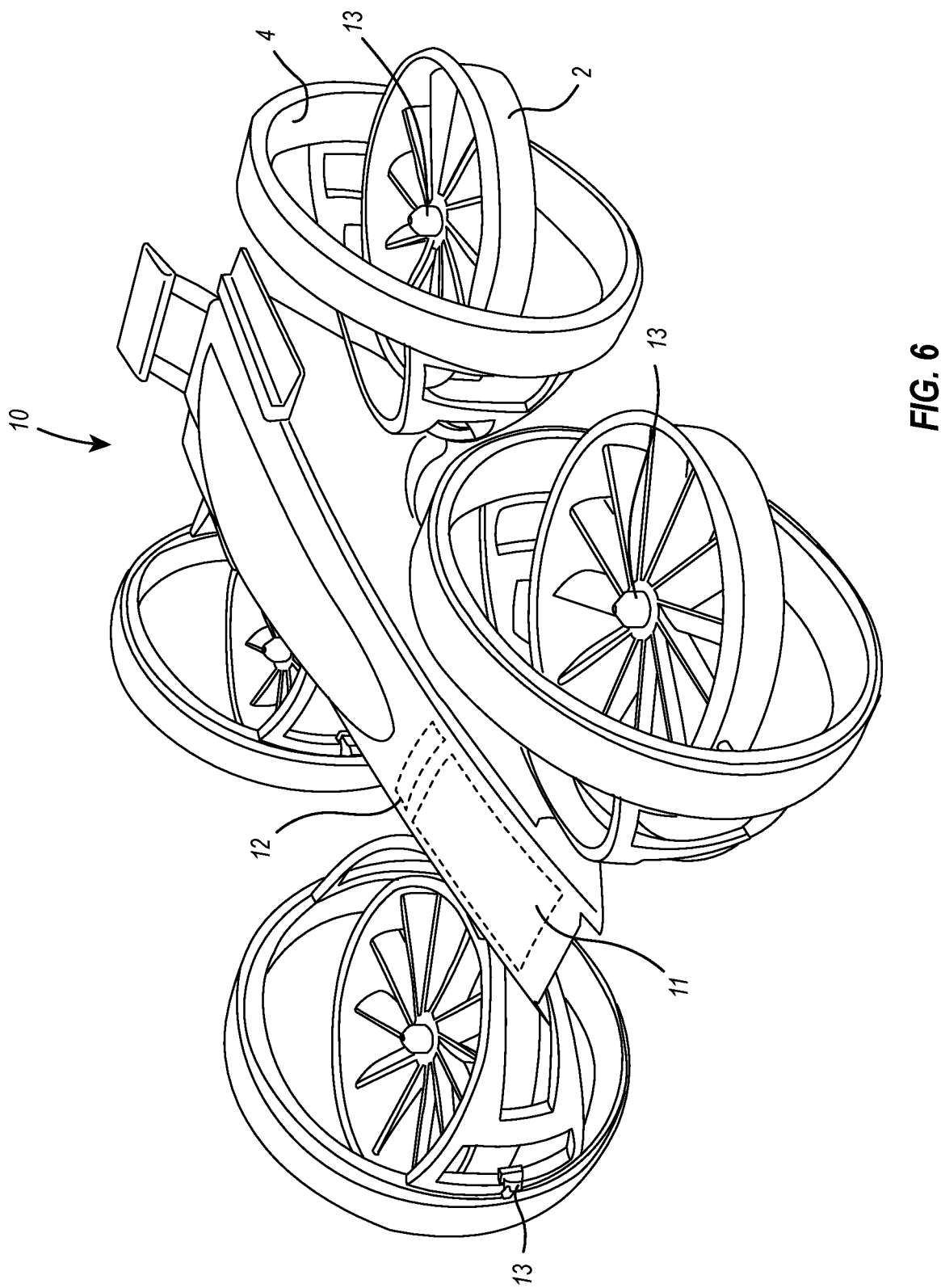
FIG. 6 shows an illustrative embodiment of an aerial vehicle with, the ducted fan or shrouded propeller drive system rotated crosswise for flying position and the rotary peripheral ground-engagement part drive system powered by electrical means.

FIG. 6 is a diagram depicting one possible embodiment of 10. an aerial vehicle and a possible configuration of an illustrative embodiment of a ducted fan or shrouded propeller drive system and the rotary peripheral ground-engagement part drive system as described in FIG. 1 powered by electrical means. This necessitates an electric power source 11., e.g., a battery pack or genset engine, with use of 126. an electric speed control (ESC) to govern the amount of power supplied to 13. an electric motor. This illustrative embodiment of 10. an aerial vehicle shows the 2. ducted fan or shrouded propeller drive system rotated or tilted to facilitate air travel. This may be accomplished by having a gimbal on a ring between the hubless wheel rim and the ducted fan or shrouded propeller drive system, which allows for the ducted fan to rotate on an axis in a forward and rear direction as well as side to side and by a servo motor or other device that governs the speed and degree of rotation as described above. Additionally, an embodiment could be shown where the entire axle could tilt or rotate forward or backwards at the point where the 4. peripheral ground-engagement part connects to the frame of the 10. aerial vehicle thereby negating the additional gimbal and ring between the hubless wheel and the ducted fan housing.

The invention claimed is:

1. A propulsion system for an aerial vehicle or toy aerial vehicle comprising:
   a ducted fan or shrouded propeller drive, the ducted fan or shrouded propeller drive system operating in a plane (x'-y') and comprising one or more blades or propellers rotatable about a rotor axis (z') for producing thrust, the one or more blades or propellers being positioned to rotate within the plane (x'-y') of the ducted fan or shrouded propeller drive; and
   a peripheral ground-engagement part, the peripheral ground-engagement part comprising a hubless wheel and a rotatable tire component, the ducted fan or shrouded propeller drive being secured within the hubless wheel by two pivot points on opposing sides of a duct of shroud of the ducted fan or shrouded propeller drive, such that the plane of the ducted fan or shrouded propeller drive is pivotable about a pivot axis (x') spanning between the two pivot points, the pivot axis (x') being orthogonal to a hubless wheel axis (z) of the peripheral ground-engagement part.

2. The propulsion system according to claim 1, wherein the rotatable tire component of the peripheral ground-engagement part comprises a tire mounted on a rim portion of the hubless wheel for rotation about the hubless wheel axis (z).

3. The propulsion system according to claim 1, wherein the two pivot points of the ducted fan or shrouded propeller drive are secured to a rotatable ring within the hubless wheel, the rotatable ringer configured to rotate about the hubless wheel axis (z), such that the ducted fan or shrouded propeller drive may pivot both side to side via the two pivot points and front to back via the rotatable ring, inside the peripheral ground-engagement part.

4. The propulsion system according to claim 3, wherein the pivot axis (x') intersects a fixed plane (x-y) of the peripheral ground-engagement part.

5. The propulsion system according to claim 3, wherein the pivot axis (x') lies in the plane (x'-y') of the ducted fan or shrouded propeller drive.

6. The propulsion system according to claim 1, wherein the plane (x'-y') of the ducted fan or shrouded propeller drive and the hubless wheel axis (z) are perpendicular to each other during at least one operational configuration of the propulsion system.

7. The propulsion system according to claim 2, wherein the rotor axis (z') of the ducted fan or shrouded propeller drive and the hubless wheel axis (z) intersect each other.

8. The propulsion system according to claim 2, wherein a center of the ducted fan or shrouded propeller drive and a center of the hubless wheel coincide with each other.

9. The propulsion system according to claim 1, wherein the peripheral ground-engagement part includes a support for attaching a rim portion of the hubless wheel to a vehicle chassis.

10. The propulsion system according to claim 9, wherein the ducted fan or shrouded propeller drive is connected to the support via the peripheral ground-engagement part.

11. The propulsion system according to claim 9, wherein the support comprises brackets connected to suspension struts.

12. The propulsion system according to claim 1, further comprising one or more motors for driving the ducted fan or shrouded propeller drive, wherein at least one of the one or more motors is located within the peripheral ground-engagement part.

13. The propulsion system according to claim 1, further comprising one or more motors for driving the hubless wheel and not the ducted fan or shrouded propeller drive.

14. An aerial vehicle or a toy aerial vehicle comprising:
   a chassis and one or more propulsion systems connected to the chassis, each propulsion system comprising:
      a ducted fan or shrouded propeller drive, the ducted fan or shrouded propeller drive operating in a plane (x'-y') and comprising one or more blades or propellers rotatable about a rotor axis (z') for producing thrust, the one or more blades or propellers being positioned to rotate within the plane (x'-y') of the ducted fan or shrouded propeller drive; and
      a peripheral ground-engagement part, the peripheral ground-engagement part comprising a hubless wheel and a rotatable tire component, the ducted fan or shrouded propeller drive being secured within the hubless wheel by two pivot points on opposing sides of a duct of shroud of the ducted fan or shrouded propeller drive, such that the plane of the ducted fan or shrouded propeller drive is pivotable about a pivot axis (x') spanning between the two pivot points, the pivot axis (x') being orthogonal to a hubless wheel axis (z) of the peripheral ground-engagement part.

15. The aerial vehicle of claim 14, further comprising one or more additional ducted fans or shrouded propellers not inside the hubless wheel, but attached to the aerial vehicle configured to add additional thrust or lift.

16. The aerial vehicle of claim 14, wherein the ducted fan or shrouded propeller drive comprises rim-driven or hubless ducted fans or rim-driven or hubless shrouded propellers inside the hubless wheel.

17. A propulsion system for a vehicle configured for air and ground travel, the propulsion system comprising:

a peripheral ground-engagement part comprising a hubless wheel and a tire component mounted on the hubless wheel such that the tire component is rotatable about a hubless wheel axis (z); and a shrouded propeller drive comprising:
 a ring rotatably secured within the hubless wheel of the peripheral ground-engagement part, the ring being rotatable about the hubless wheel axis (z), independent of rotation of the tire component;
 a shroud pivotably secured within the ring, the shroud having at least one pivot point about which the shroud can rotate in relation to the ring about a shroud axis (x'), wherein the shroud axis (x') is perpendicular to the hubless wheel axis (z) and is fixed in relation to the ring; and
 one or more propellers rotatably affixed to the shroud, the one or more propellers being rotatable about a rotor axis (z') for producing thrust, wherein the rotor axis (z') is fixed in relation to the shroud and is perpendicular to the shroud axis (x').

18. The propulsion system of claim 17, further comprising a grounded configuration wherein a plane of rotation of the one or more propellers coincides with a plane or rotation of the hubless wheel.

19. The propulsion system of claim 17, wherein combined rotation of the ring about the hubless wheel axis (z) and the shroud about the shroud axis (x') enables the shrouded propeller drive to rotate in pitch, yaw, and roll relative to the peripheral ground-engagement part.

* * * * *